(12) United States Patent
Van Rozen (10) Patent No.: US 9,342,435 B2
(45) Date of Patent: May 17, 2016

(54) EMBEDDING DYNAMIC INFORMATION IN ELECTRONIC DEVICES

(75) Inventor: Riemer Andries Van Rozen, Amsterdam (NL)

(73) Assignee: EchoStar Technologies L.L.C., Englewood, CO (US)

( * ) Notice: Subject to any disclaimer, the term of this patent is extended or adjusted under 35 U.S.C. 154(b) by 944 days.

(21) Appl. No.: 13/504,468

(22) PCT Filed: Oct. 27, 2010

(86) PCT No.: PCT/IB2010/002864
§ 371 (c)(1),
(2), (4) Date: Oct. 9, 2012

(87) PCT Pub. No.: WO2011/051802
PCT Pub. Date: May 5, 2011

(65) Prior Publication Data
US 2013/0132932 A1    May 23, 2013

Related U.S. Application Data

(60) Provisional application No. 61/255,376, filed on Oct. 27, 2009.

(51) Int. Cl.
*G06F 9/44* (2006.01)
*G06F 9/45* (2006.01)
*G06F 11/36* (2006.01)
*G06F 9/445* (2006.01)

(52) U.S. Cl.
CPC .............. *G06F 11/3624* (2013.01); *G06F 8/41* (2013.01); *G06F 8/443* (2013.01); *G06F 8/54* (2013.01); *G06F 11/362* (2013.01); *G06F 11/3664* (2013.01)

(58) Field of Classification Search
None
See application file for complete search history.

(56) References Cited

U.S. PATENT DOCUMENTS 7,039,859 B1    5/2006    Sundaresan
2007/0113221 A1    5/2007    Liu et al.

OTHER PUBLICATIONS

European Patent Office "International Search Report" mailed Sep. 6, 2011; International Appln. No. PCT/IB2010/002864, filed Oct. 27, 2010.
Anonymous "Xcode 2 User Guide, Chapter 1, Parts V,VI" May 23, 2006, Apple Inc., XP002619555, pp. 1-42, 277-460.
Muchow, John "JSON Framework for Iphone; Iphone JSON and Flickr Tutortial, Parts 1,2" [Online], Sep. 8, 209, p. 11PP, SP002619556, iOS Developer Tips, Retrieved from the Internet: <URL:http://iphonedevelopertips.com/networking/json-framework-for-iphone.html>, [retrieved on Jan. 31, 2011].

*Primary Examiner* — Lewis A Bullock, Jr.
*Assistant Examiner* — Mark Gooray
(74) *Attorney, Agent, or Firm* — Ingrassia Fisher & Lorenz, P.C.

(57) ABSTRACT

Disclosure is directed to dynamically creating and embedding code and/or data in an electronic device. In one aspect, data objects are checked for conformance with a schema to prevent incorporation of incorrectly functioning data objects. A debugger may be provided to facilitate source level debugging. In another aspect, embedded interfaces are constructed to access the functionality of certain system components. Additionally, schemas may be complied into code header and files and automatically included in code libraries.

20 Claims, 7 Drawing Sheets

EMBEDDING DYNAMIC INFORMATION IN ELECTRONIC DEVICES

CROSS REFERENCE TO RELATED APPLICATIONS

This application claims priority to Patent Cooperation Treaty No. PCT/IB2010/002864, filed Oct. 27, 2010. This Patent Cooperation Treaty patent application claims priority to U.S. provisional application No. 61/255,376, filed Oct. 27, 2009, and entitled "EMBEDDING DYNAMIC INFORMATION IN ELECTRONIC DEVICES", the contents of which are incorporated herein by reference in their entirety.

TECHNICAL FIELD

Embodiments discussed herein are directed to dynamically creating and embedding code and/or data in an electronic device.

BACKGROUND

Programmers of embedded devices face a variety of design and implementation problems when using software development tools, such as the JavaScript Object Notation (JSON) format. The complexity of these software tools may prevent programmers from rapidly constructing embedded interfaces that access the state and/or behavior of a system component. These limitations may frustrate design goals such as, for example, interoperability, stability, scalability, memory use, and so. Accordingly, improved code development tools may be desirable.

SUMMARY

Embodiments discussed herein are directed to dynamically creating and embedding code and/or data in an electronic device. In one aspect, data objects are checked for conformance with a schema to prevent incorporation of incorrectly functioning data objects. A debugger may be provided to facilitate source level debugging. In another aspect, embedded interfaces are constructed to access the functionality of certain system components. Additionally, schemas may be complied into code header and files and automatically included in code libraries.

One embodiment is directed to an apparatus for embedding a library in a program, comprising: a compiler operative to receive one or more sources and output a library, the compiler further operative to output a debugger based on the one or more sources; the debugger operative to receive one or more schema and output one or more embedded program sources based on the one or more schema; the compiler further operative to accept the one or more embedded program sources and output a binary object; and a linker operative to accept the binary object and the library, the linker further operative to output a program having a library embedded therein.

Another embodiment is directed to a method for embedding a library in a program, comprising: receiving one or more sources at a compiler; outputting a library from the compiler, the library based on the one or more sources; outputting a debugger from the compiler based on the one or more sources; receiving one or more schema at the debugger; outputting one or more embedded program sources from the debugger based on the one or more schema; accepting the one or more embedded program sources at the compiler; outputting a binary object from the compiler based on the one or more embedded program sources; and accepting the binary object and the library at a linker; outputting a program having a library embedded therein from the linker.

BRIEF DESCRIPTION OF THE DRAWINGS

Various aspects of the present invention may be better understood upon reading the following detailed description of non-limiting embodiments and examining the accompanying drawings, in which.

DETAILED DESCRIPTION

Certain embodiments take the form of a software development kit (SDK) for JavaScript Object Notation (JSON) that includes, among other elements to be discussed herein, a Schema Application Programming Interface (Schema API). This SDK and all associated functionality is typically resident on or in an electronic device, such as a set-top box, cable box, television, audiovisual receiver or other television receiver. The SDK, through the API, generally provides a structured environment and front end for dynamically creating and manipulating JSON data during operation (e.g., run time) of an electronic device or certain operations on such a device This, in turn, permits the use and/or implementation of various "schemas." A schema essentially acts as a contract between two or more components or applications of the electronic device, permitting or regulating data flow therebetween. It should be noted that alternative embodiments may take the form of a SDK or other front end for a platform independent package other than JavaScript, or particularly other than JSON.

Examples of a JSON SDK design are object oriented and platform independent. As one non-limiting example, the SDK may be implemented and embedded in any environment that includes, compiles or may otherwise execute ANSI C90. As another example, the SDK may be implemented in Java. In short, the design of the SDK is relatively platform independent. An SDK library may be embedded as part of any program, as shown to best effect in FIG. 1.

Figure 1:
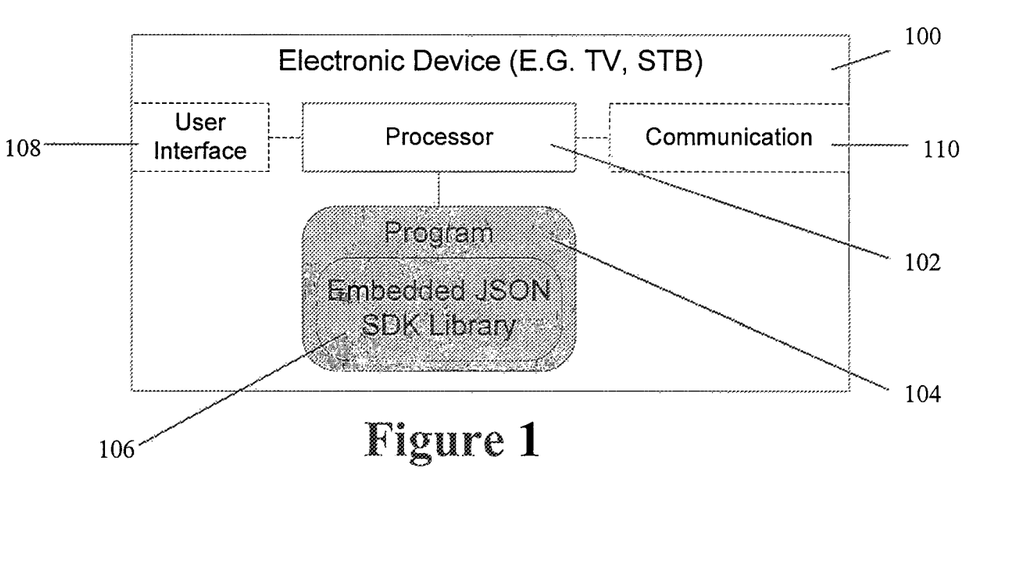
FIG. 1 is a simplified block diagram of an electronic device for implementing a JSON SDK.

FIG. 1 is a block diagram of a simplified electronic device 100 that may be employed as a hardware platform that executes one or more applications, such as the JSON SDK. The electronic device 100 typically includes a processor 102 coupled with a storage device upon which one or more programs 104 are stored. Each such program 105 may have an embedded library 106 contained within, in accordance with the description set forth herein. As one example, the embedded library may be a JSON SDK library. Accordingly, when a program is retrieved from storage and executed, it may implement the embedded library to control data flow, specify particular data to be retrieved, processed or otherwise utilized by the program, transmit data between programs and/or hardware, and so on. Essentially, and as described herein, the embedded library permits instantiation of a schema API. The schema API, in turn, acts as an abstraction layer and provides an avenue to create and manipulate JSON data at run time through the schema restricted name space.

A user interface 108 permits a user to interact with the electronic device 100, typically by issuing one or more commands to the processor 102. Such commands may relate to the operation of the device and/or to objects accessed via the schema API. As one example, the user interface 108 may permit a user to initiate a command to an object which, in turn, may activate or deactivate a function or element of the device. Continuing the example, the command may employ an object conforming to an LED schema to turn an LED on or off [Example user interfaces include keyboards, mice, buttons, touchscreens, remote controls and other devices known to those skilled in the art. In addition, the electronic device 100 may include an input or other communication device 110 that connects the device to other electronic devices or a network.

The processor 102 may be any suitable processor, such as a microprocessor, microcontroller, or similar control circuitry configured to execute software, firmware, and the like (collectively referred to as "software" herein) stored in the storage device 104 to perform one or more functions or operations for which the device 100 is designed. For example, the processor 102 may be configured to process instructions of the JSON SDK.

The storage device 104 may be implemented in any suitable storage medium. For example, the storage device 104 may include volatile data storage, such as dynamic random-access memory (DRAM) or static random-access memory (SRAM), nonvolatile data storage, such as flash memory, magnetic disk drives, solid state drives, and optical disk drives, or combinations thereof. The storage device 104 stores digital data, including an operating system, one or more software applications, and associated software and static data for the processor 102 to access and execute. The storage device 104 may also store variable data, pointer information, and the like utilized by the processor 102 to execute the software. In some embodiments, the processor 102 and the storage device 104 (as well as other components) may be implemented as an application specific integrated circuit (ASIC) or as a system-on-chip (SOC).

As noted above, the electronic device 100 may include the communication interface 106 and the user interface 108 of FIG. 1. The communication interface 106 may be any suitable interface including a WAN interface, LAN interface and/or a wireless network adapter or other suitable interface to allow the device 100 to communication with other devices via communication networks, such as the Internet. For example, the communication interface 106 may include an Ethernet interface, a cable or digital subscriber line (DSL) interface, a Wi-Fi interface, or a cellular communication network interface. JSON strings may be transmitted via the communication device to one or more other electronic devices.

The user interface 108 of the electronic device 100 is configured to receive commands from a user to control the device 100. The user interface 108 may include or be coupled with any number of input and/or output components to allow the user to interact with the electronic device 100, such as a keyboard, keypad, mouse, joystick, touchpad, visual monitor, video display, and/or audio speakers. In some cases, the user interface 108 may incorporate a remote control interface so that the user need not be positioned within reach of the device 100 to provide input thereto. Virtually any type of processor-driven electronic device, including embedded special-purpose devices, may serve as the electronic device 100 in specific embodiments. For example, in one embodiment, the electronic device 100 is a media content or other television receiver, such as a television set-top box (STB) for satellite, cable, or terrestrial ("over-the-air") transmissions. Typically, set-top boxes are configured to receive programming from at least one audio/video source, such as a satellite in geosynchronous orbit, a coaxial cable head-end, or a terrestrial antenna. As such, in set-top box embodiments, in addition to the components depicted in FIG. 1, the device 100 may also include circuitry typically associated with a set-top box, such as an antenna or cable input to receive the multiple channels of television programming, one or more tuners for selecting one of the channels, and decoding and/or decrypting circuitry and output circuitry for presenting the audio and/or visual aspects of the selected channel to the user. It should be appreciated that alternate embodiments may take the form of, or be included within, any suitable electronic device including televisions, audiovisual equipment, computing devices, and so on.

Figure 2:
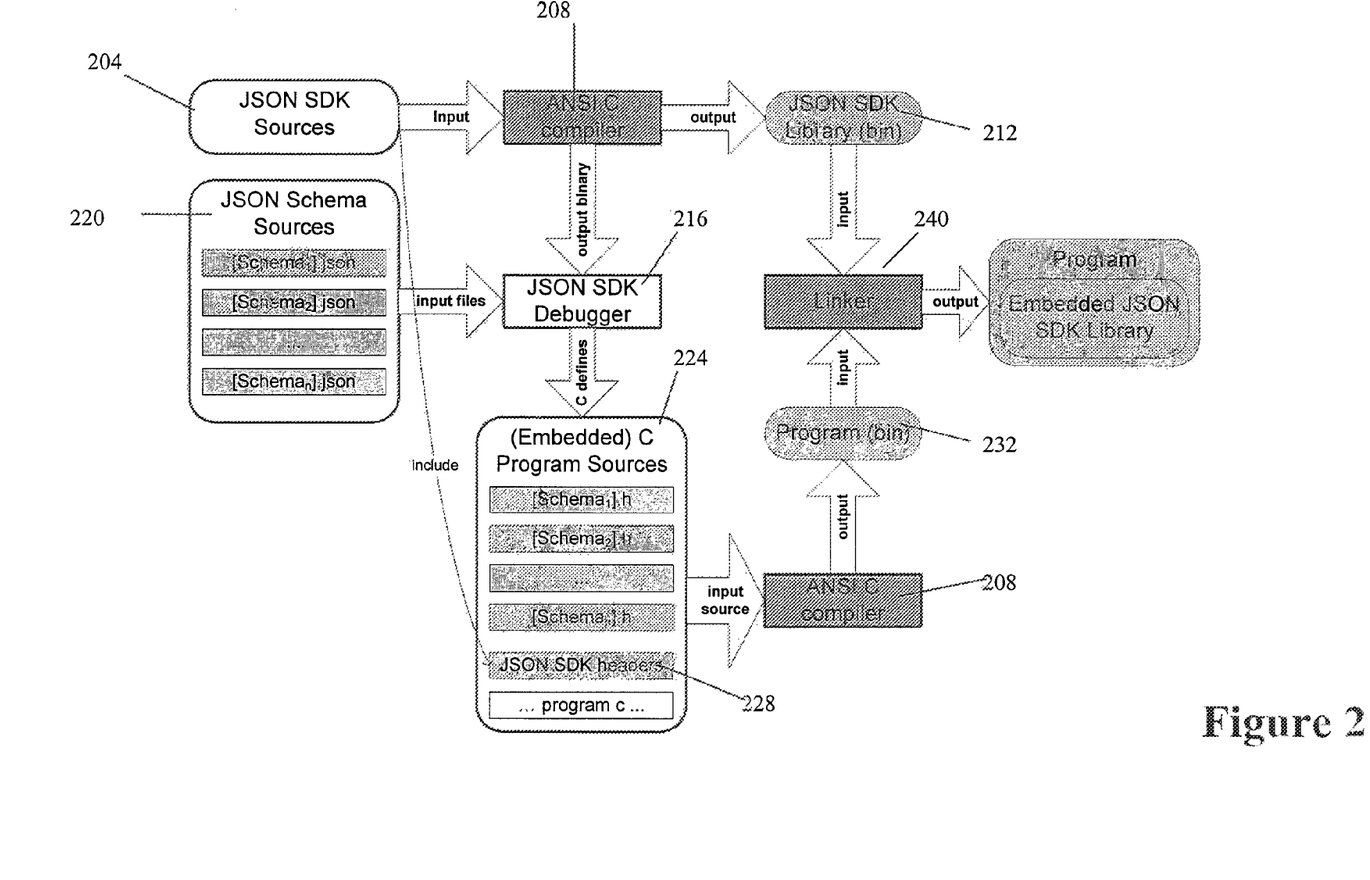
FIG. 2 is a data flow diagram showing the creation of a program having an embedded library.

FIG. 2 is a data flow diagram showing the creation of a program having an embedded JSON SDK library. Generally, one or more JSON SDK sources 204 serve as input for an ANSI C compiler 208. The compiler outputs a JSON SDK library 212 in binary format, which is based on the SDK sources 204 inputted into the compiler 208. This library 212 will be discussed in more detail shortly.

The ANSI C compiler 208 can compile the SDK to a library 212 and/or to a debugger 216. In other words, the compiler 208 may use the SDK to implement the debugger 216 (e.g., the debugger may be an output of the compiler). It should be noted that the JSON SDK may be compiled in different modes, which may be activated or selected through the use of switches. A main switch permits switching between building of the debugger 216 and building of an embeddable library 212. Further, a lite switch may turn off functionality in the JSON library that is not necessary for operation of the electronic device. As one example, certain electronic devices do not operate on floating point numbers, and so the lite switch may deactivate floating point number operation when the lite switch is toggled. As another example, the lite switch may deactivate particular error messages or certain C functionality not otherwise used by the electronic device. By implementing and activating the lite switch, the memory footprint of the embedded library may be reduced. In the SDK, the main switch may be called a JSON_MAIN switch and the lite switch may be called a JSON_LITE switch.

The debugger 216, which is described below in more detail with respect to FIG. 7, permits a user to analyze and debug JSON data. The debugger 216 also accepts one or more schema sources 220 as inputs to facilitate debugging. It should be noted that these the SDK sources, are generally in a format compatible with the ultimately embedded library such as C or Java. Further, the schema sources 220 are generally in a JSON format.

The debugger 216 outputs one or more ANSI C schema 224 as defined statements that may be used in an embedded C program source. These C defined schema 224 generally correspond to the JSON schema sources 220 that act as inputs to the debugger 216, but instead are implemented in the C programming language (although, in alternative embodiments, different languages may be used). In FIG. 2, this relationship is shown insofar as each numbered schema (Schema1, Schema2, ... SchemaN) in the C program source block 224 is the same as the schema in the JSON schema source block 220, albeit with different file extensions.

Also included in the embedded C program sources are one or more JSON SDK headers 228. These headers 228 are taken from the aforementioned JSON SDK sources that serve as input(s) for the ANSI C compiler. Along with a program written in ANSI C, the schema and headers 228 serve as an input to an ANSI C compiler 208.

The compiler 208, in turn, creates one or more binary object files 232 from the various program sources. These binary object files 232 are transmitted or passed to a linker 240; the linker 240 also accepts the binary SDK library from the ANSI C compiler. The linker 240 acts to embed the binary SDK library in the binary program and link the object files, resulting in a binary program with a custom embedded JSON SDK library.

Generally, an "object" as used herein is a collection of data items, possibly associated with functions or other methods capable of manipulating the data items. In the specific case of the JSON implementation discussed herein and electronic devices employing a JSON SDK, the received definitions are embodied as one or more JSON "schemas", which are definitions of JSON data structures or objects based on the JSON standardized data format. As previously mentioned, a JSON schema functions as a "contract" defining what types and forms of data are required for one of more of applications, in what ways that data may be modified or manipulated, and the like. In other words, the schema defines a particular portion of an application programming interface (API) to be used by an application, such as a browser application. A browser application may employ the resulting objects associated with the schemas received via communication software to initiate commands and other communications with a set-top box applications via the API.

Figure 3:
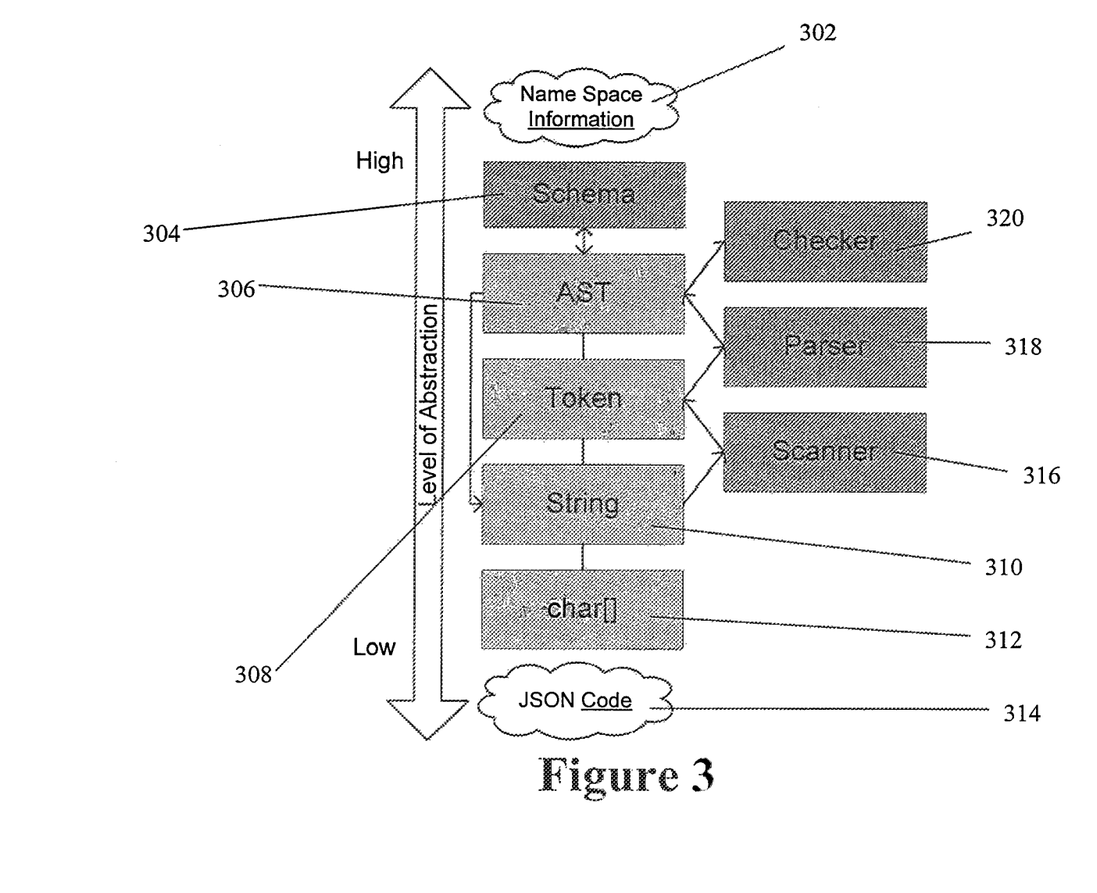
FIG. 3 illustrates one sample abstraction for the JSON SDK, particularly showing abstractions that overlay code and provide namespace information.

Implementation of the JSON SDK within a sample electronic device may be derived from various levels of abstraction. These levels of abstraction may be implemented as components within an API FIG. 3 illustrates the levels of abstraction 300 for the JSON SDK with a Schema API. Starting at the highest level of abstraction and moving toward the lowest, the levels include name space information 302, Schema API 304, Abstract Syntax Tree (AST) 306, Token 308, String 310, Char[ ] 312 and JSON code 314. As such, JSON code is the lowest level of abstraction. The schema is created from the AST. The name space information relates to names given to particular objects in the schema that allow for data to be identified by name.

These various abstraction levels may interact with a scanner 316, parser 318 and/or checker 320 implemented in the electronic device 100 and executed by the processor. Generally, and as shown in FIG. 3, the string serves as an input to the scanner, which tokenizes JSON code in the string and provides one or more corresponding tokens to the parser. The parser 318 parses the tokens into objects and outputs the AST 306. The checker 320 compares the parsed objects with a schema to determine compliance with the schema, which is discussed in greater detail below.

The schema API 304 is the component or abstraction that must be instantiated by the compiler to allow a user to employ the SDK. The schema API is instantiated in an application with an embedded JSON SDK. JSON strings are parsed to objects, represented as ASTs. The objects are manipulated through the Schema API 304 and transformed back into JSON strings before being offered to another component. New JSON objects can be instanced through the Schema API 304 where optional objects and optional default fields are omitted. Additionally, required defaults objects and arrays may also be added. Additionally, objects can be checked against their schema to ensure an object conforms to the schema and does not break the contract between components. Moreover, objects can be sorted to the ordering of the schema for data presentation where a client application users the JSON schema as a view for the object.

Thus, the checker verifies that that a created or manipulated object conforms to its schema. The schema component, in turn, ensures conformance by preventing any addition to any object that does not conform to the particular schema. In particular, the Schema API 304 provides a means for dynamically creating and manipulating JSON data at run-time with respect to JSON schemas (i.e., inter component contracts) via the schema restricted (JavaScript) name space 302.

The JSON SDK is a platform independent multi-pass compiler which may be implemented from zero in a programming standard, such as ANSI C90, and, as such, does not rely on any other libraries. The JSON SDK has an object oriented design and is thus platform independent, while the particular ANSI C90 implementation may be embeddable.

Figure 4:
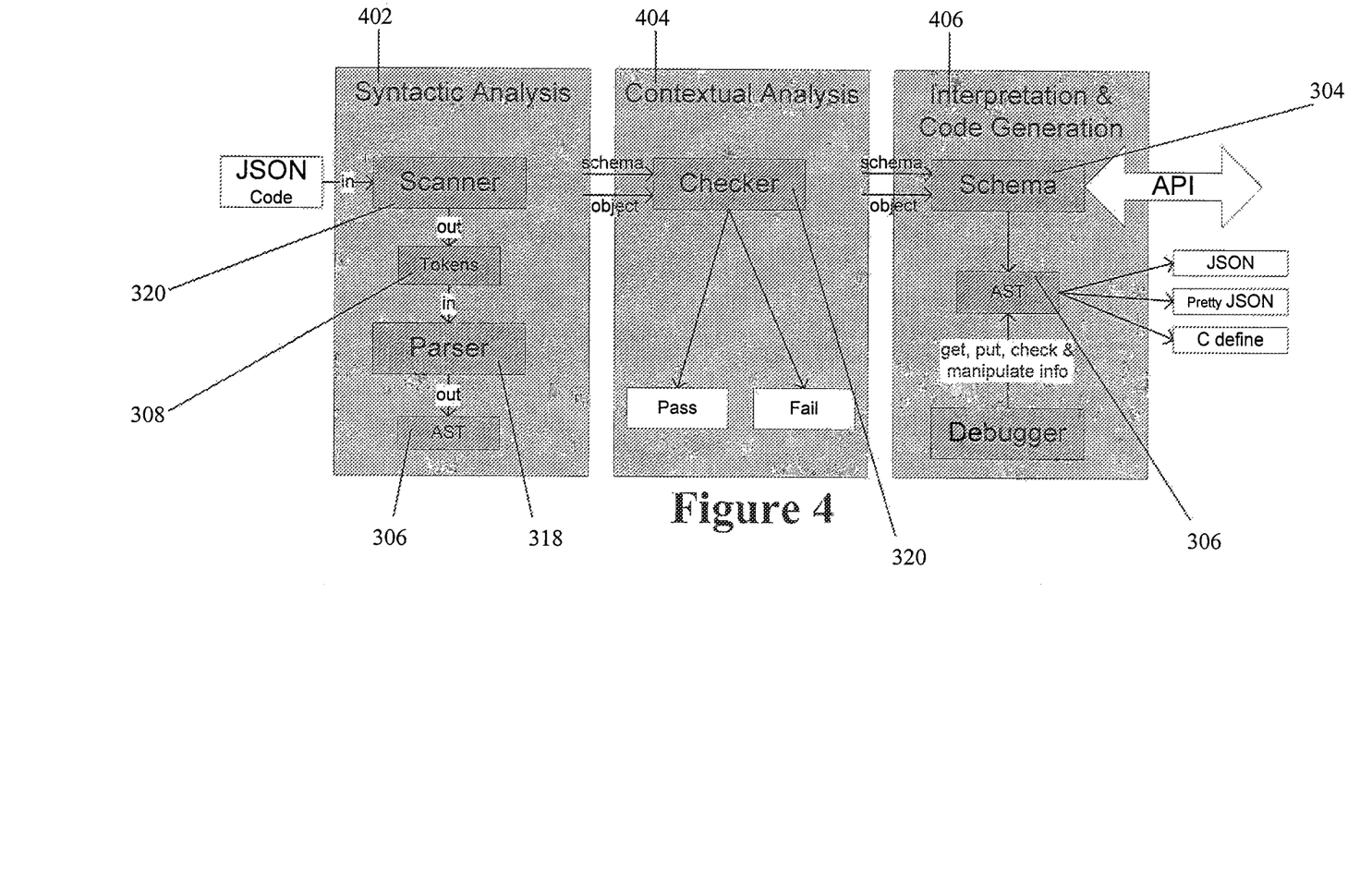
FIG. 4 is an example flow diagram of a multi-pass JSON compiler implementing the JSON SDK.

FIG. 4 is a block diagram 400 showing a sample multi-pass JSON compiler as well as its operation, which may include three general steps. The steps include a syntactic analysis 402, contextual analysis 404, and interpretation and code generation 406. The syntactic analysis 402 includes scanning JSON code 408 to generate tokens 308 and parsing the tokens 308 into objects of the abstract syntax tree (AST) 306. In particular, the parser parses a string by accepting tokens in a particular order. Further, there are two ASTs in the schema abstraction (each of which are parsed). That is, both the JSON schema and the corresponding JSON object are parsed. Generally, the object includes information and the schema defines a form for the object. Thus, the schema restricts objects and assists in retrieving information for the object.

A contextual analyzer 404 is provided with the JSON SDK to check if objects conform to their respective JSON schemas (i.e., do not break the contract) and, thus, may prevent bad JSON data structures. The schemas can be compiled to C headers to be included into the code instead of conventional transposing of the schema to a C header by hand.

Additionally, the JSON SDK provides source level JSON debugging that may speed up product development. The SDK allows users to rapidly construct embedded JSON APIs which may be used to expose selected aspects of the state and behavior of a system component. Thus, by exposing the state and/or behavior of a system, data may be transmitted between JSON SDKs on different electronic devices. This transmission may occur through the communication device and may take the form of strings, for example.

Figure 5:
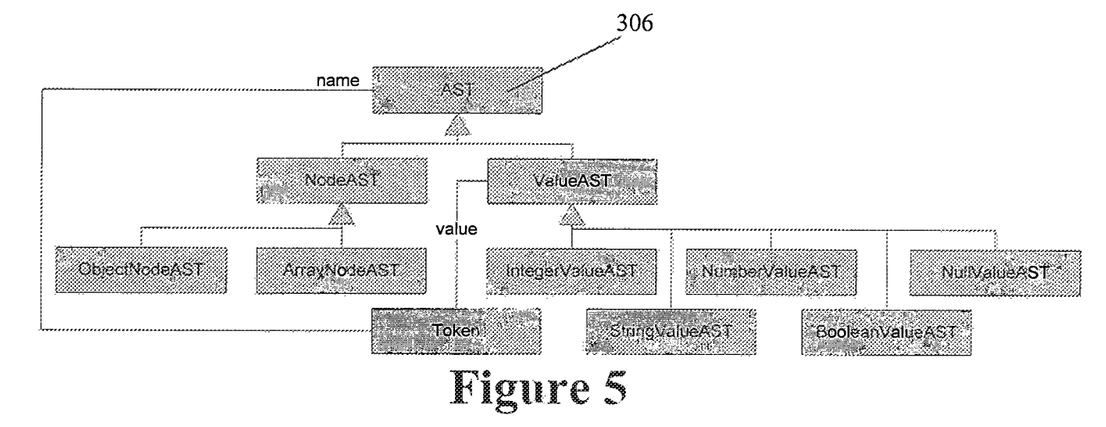
FIG. 5 illustrates decomposition of an abstract syntax tree by a parser.

FIG. 5 illustrates tree classes 500 in accordance with an embodiment of the AST 306. As illustrated, the top node represents the AST 306 for an object and the lower levels show the class hierarchy. Every node has a name and the AST inheritance structure is illustrated. The inheritance structure refers to the sharing/accessibility of programming code between nodes in the AST. This is a result of JavaScript being an object oriented programming language. The AST shown in FIG. 5 is a top-level abstract syntax tree and includes or inherits the behavior of all lower AST nodes. This top level AST is an abstract construct. Briefly describing FIG. 4, the top level AST derives its name from a token. The NodeAST abstracts a node in the tree and the ValueAST abstracts a tree leaf; both are generated by the parser. The ObjectNodeAST abstracts an object while the ArrayNodeAST abstracts an array; both are likewise generated by the parser. The ValueAST encapsulates several sub-ASTs that contain integer values, string values, number values, Boolean values, and null values for a given object.

Returning to FIG. 4, the parsed schema string and object string are provided to a checker 320 for contextual analysis 404. It should be noted that both the schema and object strings are themselves ASTs. The checker 320 compares the object against the schema to determine compliance of the object with the schema. This check is performed by simultaneously traversing both the schema and the object ASTs and comparing the resulting outputs. If the object does not comply with the schema, the object fails the contextual analysis and details of the error are provided to a programmer (i.e., via an output display) to allow for the programmer to correct the errors.

In one embodiment, if there is an undefined field in the object which the schema indicates should be defined, an error message may be provided indicating the there is an error in the object code that should be addressed. In some cases, for example, an undefined field in the object code may cause the checker to detect that the contract is broken and the object does not conform to the schema. The checker API may flag a missing field in one of the schema and corresponding object, thereby allowing the field to be properly defined.

Figure 6:
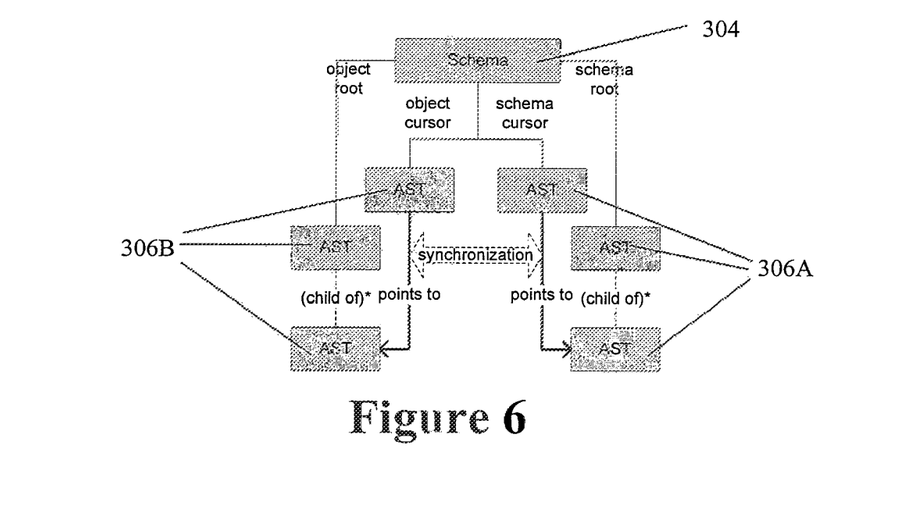
FIG. 6 is a static structure diagram of a schema abstraction in the JSON SDK.

In the event the object complies with the schema (e.g., includes the appropriate fields, etc.) the object passes the contextual analysis. Objects passing the contextual analysis, along with their corresponding schema, may be provided to the Schema API 304 for abstraction and interfacing with the API. Alternately, the Schema API object output may serve as an input to the contextual checker to ensure the object passes analysis. In such a case, the Schema API object may operate prior to the contextual analysis and the object is not passed back to the Schema API. Instead, the object is considered finished and may be used as necessary (for example, it may be passed to another component as a string, as described above). FIG. 6 illustrates a static structure diagram 600 of the schema abstraction decomposition. The schema abstraction includes an object root and a schema root, which are pointers to the abstract syntax trees that represent the object and the schema strings. Additionally, an object cursor and schema cursor are provided that are pointers to AST nodes. As the object cursor and the schema cursor traverse the AST they should be synchronized to allow retrieval of information from both object and schema, as well as to disallow storing in the schema any information that is not defined by the schema.

In certain embodiments, a mis-synchronization may be overcome by reliance on the schema. Specifically, objects in the schema may be defined as a particular type and as optional or non-optional. (Type and optional are key words in the schema.) If the field is optional, the schema may be searched independent from the object. Schema AST nodes may be traversed, or searched, by the schema cursor. Generally, the cursor is moved from a parent node to a child node. Each parent node includes a list of (or reference to) child nodes. The schema API may traverse a name space by traversing the AST nodes listed therein; AST nodes may be included in the name space in a dot separated name format or other appropriate format. The name space for any node sets out all child nodes, including objects, arrays and so forth.

It should be noted that the embodiment may operate in an asynchronous mode, in which the schema API allows the retrieval of default fields that are otherwise declared as optional. Nonetheless, this does not allow the embodiment to store information when the object and schema cursors operate in an asynchronous mode. Data storage is disallowed since the schema cursor defines a part of the schema that cannot be added at the object cursor.

A default may be set in the schema for certain fields. The default may be provided to the object field if left undefined. For example, a calculator function may have a defined default operator, such as an addition operator. Continuing the example, if an object is provided with two values and no operator, the two values may automatically be added. Typically, object fields having a corresponding optional default defined in the schema are not defined in the object. In this manner, the value or entry in the undefined object field may be instead retrieved from the corresponding schema. In other words, the schema fields may be treated as default fields.

Alternatively, certain non-optional defaults may be automatically added to an object field and be replaced by another value later. Further, the embodiment operates recursively. When an object is instantiated from a schema, the schema name is added to the object. Values for non-optional fields in the object may be added from the schema. Optional fields are typically undefined when the object is instantiated and are later defined by a user. Upon definition of an optional field, the embodiment checks the schema again with the checker to see if any sub-fields of the newly defined optional field are non-optional. If so, these values may be copied from the schema as described herein.

Once all transformations to the object (via the schema API) are complete, the AST is transformed into a JSON string. That is, the AST may be made into a string through an appropriate API function. In one embodiment, JSON code 424 may be provided on a single line i.e., without line returns) while in another JSON code 426 may be formatted.

Additionally, the schema is transposed into a C header, as each schema needs to be in C code in order to be embedded with a C based embedded device. The transposing of the code into C is automated and performed by the device 100 during compilation.

A debugger 430 may be called from a command line to analyze relevant data, such as JSON data. The debugger may permit a user to generate C definitions from a schema, to parse a JSON file, to check an object against its schema, and/or to interactively edit objects from a command line and via the schema API. The debugger 430 may access various classes of the AST 306 to allow a programmer to troubleshoot and debug code from a command line. As the debugger 430 is accessible at the command line, the debugger may not be enabled for post-compiled embodiments such as the STB example described above. However, the debugger 430 may be enabled for all testing, programming and computing environments, such as those that may be implemented on a personal computer, for example.

Figure 7:
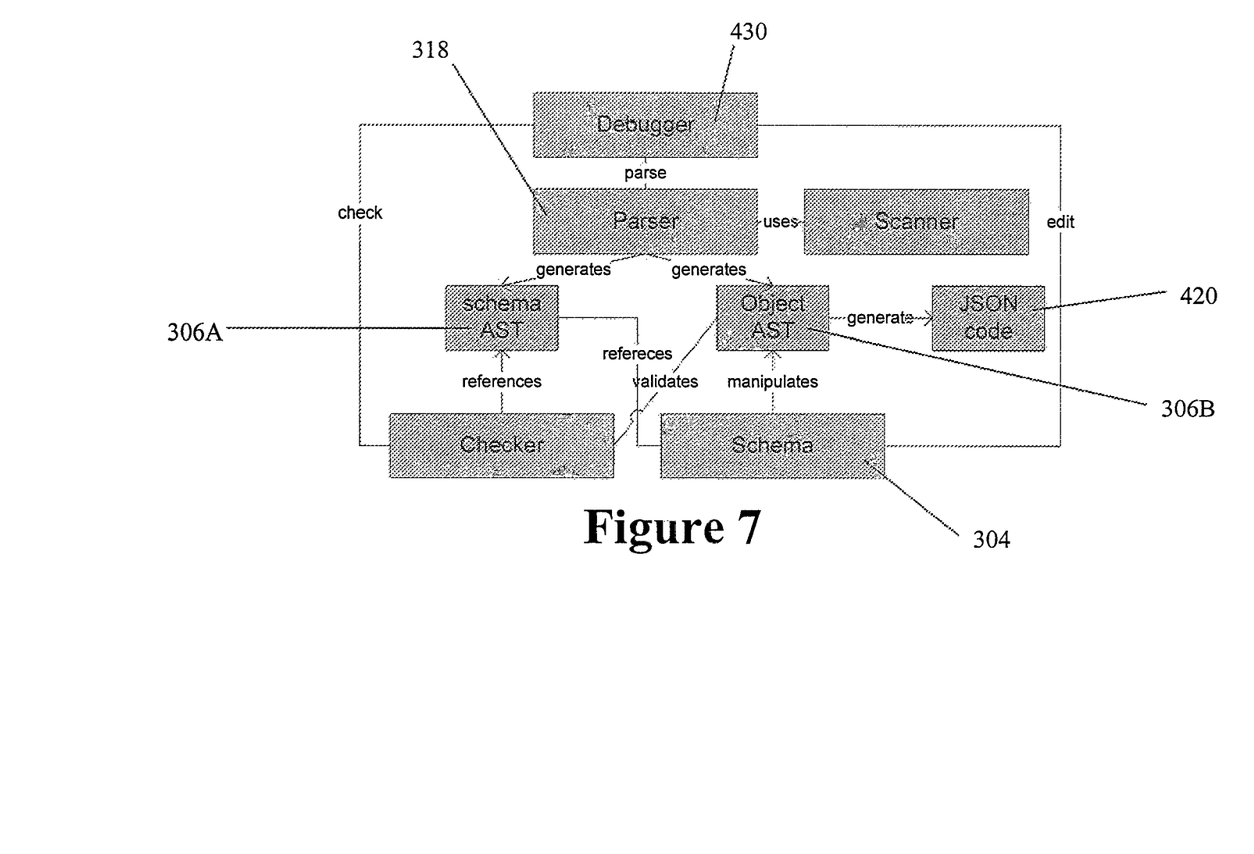
FIG. 7 is a static structure diagram for a debugger for the JSON SDK.

FIG. 7 illustrates a static structure diagram for the debugger 430. The debugger 430 may parse JSON code using the parser 318. The parser 318 may use the scanner 316 to tokenize the strings prior to parsing the JSON code. The debugger 430 uses the checker to validate the object AST 306B against its corresponding schema and to edit the object AST 306B, if necessary. The checker 320 may reference the parsed schema AST 306A and approve or deny the parsed object AST 306B based on a comparison of the object AST 306B with the schema AST 306A. The Schema API 304 may reference the schema AST 306A and manipulate the object AST 306B. The manipulation of the object AST 306B may be performed automatically by the Schema API 304 or by a programmer through the Schema API 304. The object AST 306B, once manipulated to conform to the schema AST 306A, is used to generate the JSON code 420.

Figure 8:
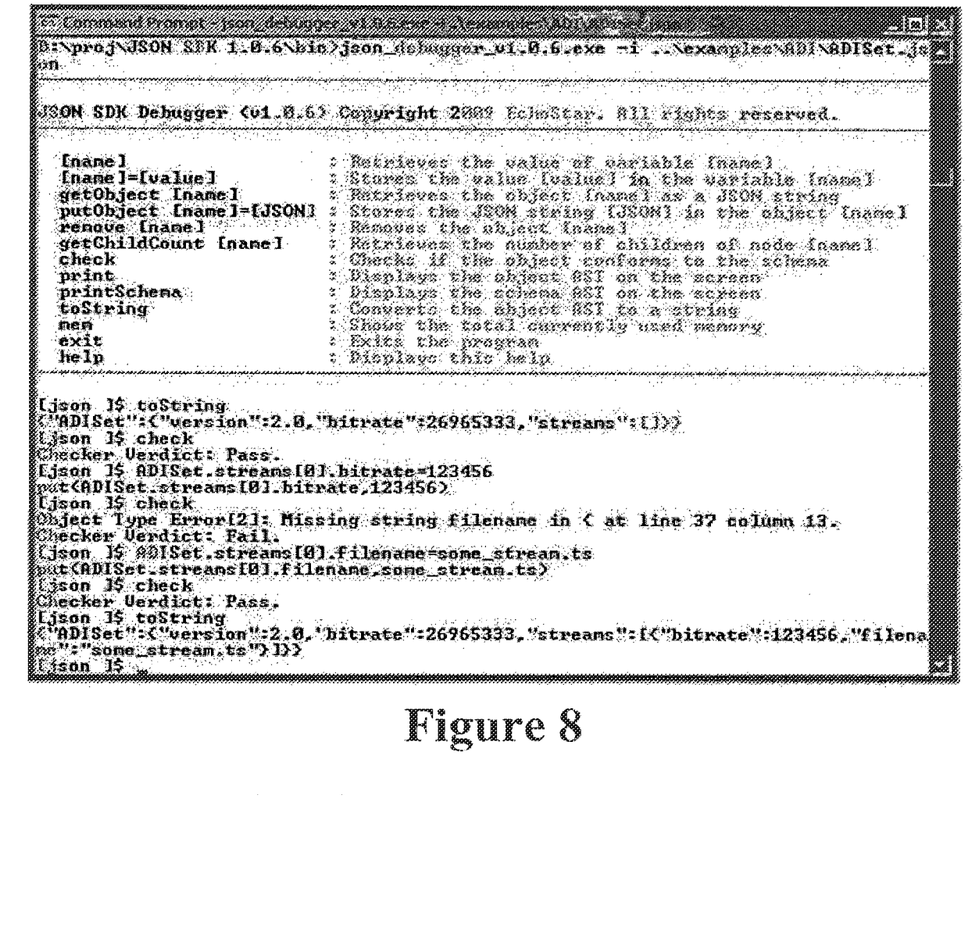
FIG. 8 is a screen shot of an example debugging from a command line using the JSON SDK.

FIG. 8 is a screen shot 800 of an example debugging from the command line. As shown, the debugger 430 is accessible at a command line. In this example, an advanced data inserter (ADI) set object is constructed from an ADI set schema (802) that is inputted through the command line. Next, the checker verifies that the ADI is properly defined (804). An object is then created that is lacking a file name (806) to test if the checker is operating properly. The checker is run again and detects the missing filename providing line and column location of the error (808). The filename omission is then corrected (810) and the checker verifies compliance (812). Once the object is in compliance the object is output (814).

The JSON debugger can be called from the command line to analyze JSON data. Users can manually call the parser and/or the checker and can interactively edit objects through the schema API to perform JSON source level debugging.

While example embodiments have been discussed herein, other implementations are possible and fall within the scope of the present disclosure. For example, while the above embodiments focus on implementations involving a television set-top box, virtually any electronic device employing a processor and software exhibiting an application programming interface may benefit from the principles discussed herein. Further, while the web application discussed above provides functionality for a user interface, any other type of functionality useful in the operation of the electronic device may be programmed in the web application as described earlier. Thus, while the present invention has been described in the context of specific embodiments, such descriptions are provided for illustration and not limitation.

What is claimed is:

1. An apparatus for embedding a library in a program, comprising:
   a processor;
   memory;
   a compiler;
   a linker, and a debugger, wherein the compiler, linker and debugger are programmed to perform the steps of:
   receiving one or more software development kit sources at the compiler of the computer system;
   in response to receiving the one or more software development kit sources at the compiler, creating and outputting a software development kit library and a binary to program the debugger, the software development kit library is based on the one or more software development kit sources;
   in response to the outputting, receiving the binary by the debugger from the compiler while receiving one or more schema sources at the debugger to facilitate debugging;
   in response to receiving the binary and schema sources at the debugger, creating and outputting one or more schema embedded program sources by the debugger based on the one or more schema sources and binary;
   sending the schema embedded program sources to the compiler;
   in response to accepting the schema embedded program sources at the compiler, creating and outputting a binary program at the compiler based on the schema embedded program sources; and
   receiving, at a linker, the binary program based on the schema embedded program sources while receiving the software development kit library;
   embedding, by the linker, the library in the binary program to thereby create a program having an embedded library;
   outputting the program having the embedded library from the linker.

2. The apparatus of claim 1, further comprising:
   a main switch that switches between a first and a second mode, wherein in the first mode the compiler operates to build the debugger, and in the second mode the compiler operates to build the library.

3. The apparatus of claim 1, further comprising:
   a lite switch that turns off functionality in the library that is not necessary for the operation of a particular electronic device.

4. The apparatus of claim 1, further comprising:
   a lite switch that turns off error messages in the library for functions that are not used by a particular electronic device.

5. The apparatus of claim 1, further comprising:
   a scanner that receives a string as input, tokenizes code in the string, and provides one or more corresponding tokens as output;
   a parser that receives the tokens from the scanner, parses the tokens into objects, and outputs the objects in an abstract syntax tree; and
   a checker that receives the abstract syntax tree from the parser and compares the objects in the abstract syntax tree with the schema to determine compliance with the schema.

6. The apparatus of claim 5, wherein the compiler further comprises:
   a syntactic analysis section that uses the scanner to tokenize an object, and uses the parser to parse the tokenized object and the schema, wherein the object includes information and the schema defines a form for the information.

7. The apparatus of claim 6, wherein the compiler further comprises:
   a contextual analysis section connected to the syntactic analysis section, the contextual analysis section uses the checker to compare the parsed object with the parsed schema to determine if the object conforms to the schema.

8. The apparatus of claim 7, wherein:
   the object and the schema both include an abstract synthesis tree having a top node and a plurality of lower nodes;
   the top node inheriting behavior from the plurality of lower nodes; and the checker simultaneously traverses both the abstract synthesis tree for the object and the abstract synthesis tree for the schema to compare the resulting outputs.

9. The apparatus of claim 8, wherein:
   the abstract synthesis tree for the object includes an optional object; and
   the checker to searches the schema independently of the optional object.

10. The apparatus of claim 9, wherein:
    the contextual analysis section includes an asynchronous mode; and the checker retrieves default values for the optional objects.

11. The apparatus of claim 8, wherein:
    the contextual analysis section operates recursively to instantiate objects form the schema; and
    the objects from the schema include a field and the contextual analysis section makes recursive passes until no further objects are instantiated and no values are undefined.

12. The apparatus of claim 11, wherein once the contextual analysis section completes its recursive passes, the abstract synthesis tree is converted to an output string.

13. The apparatus of claim 7, wherein the compiler further comprises:
    an interpretation and code generation section connected to the contextual analysis section, the interpretation and code generation section compiles the schema into a source code header to be included in a source code library.

14. The apparatus of claim 5, wherein the debugger uses the scanner to tokenize an object, the parser to parse the tokenized object, and the checker to validate the object against a corresponding schema.

15. The apparatus of claim 14, wherein the debugger uses the scanner to edit the object.

16. The apparatus of claim 14, wherein the debugger is a command line debugger.

17. A method executable by a computer system having a compiler and a debugger to embed a library in a program, the method comprising:

receiving one or more software development kit sources at the compiler of the computer system;

in response to receiving the one or more software development kit sources at the compiler, creating and outputting a software development kit library and a binary to program the debugger, the software development kit library is based on the one or more software development kit sources;

in response to the outputting, receiving the binary by the debugger from the compiler while receiving one or more schema sources at the debugger to facilitate debugging;

in response to receiving the binary and schema sources at the debugger, creating and outputting one or more schema embedded program sources by the debugger based on the one or more schema sources and binary;

sending the schema embedded program sources to the compiler;

in response to accepting the schema embedded program sources at the compiler, creating and outputting a binary program at the compiler based on the schema embedded program sources; and receiving, at a linker, the binary program based on the schema embedded program sources while receiving the software development kit library;

embedding, by the linker, the library in the binary program to thereby create a program having an embedded library;

outputting the program having the embedded library from the linker.

18. The method of claim 17, further comprising:

scanning the one or more sources to tokenize code in the sources to produce one or more tokens.

19. The method of claim 18, further comprising:

parsing the tokens into objects and outputting the objects in an abstract syntax tree.

20. The method of claim 19, further comprising:

comparing the objects in the abstract syntax tree with a schema to determine compliance with the schema.

\* \* \* \* \*